United States Patent
Breno et al.

(10) Patent No.: US 10,733,211 B2
(45) Date of Patent: *Aug. 4, 2020

(54) OPTIMIZING FACETED CLASSIFICATION THROUGH FACET RANGE IDENTIFICATION

(71) Applicant: International Business Machines Corporation, Armonk, NY (US)

(72) Inventors: Marta Breno, Rome (IT); Roberto Ragusa, Lucera (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,247

(22) Filed: Dec. 19, 2017

(65) Prior Publication Data

US 2018/0107733 A1 Apr. 19, 2018

Related U.S. Application Data

(63) Continuation of application No. 14/549,991, filed on Nov. 21, 2014, now Pat. No. 9,886,494.

(51) Int. Cl.
*G06F 16/00* (2019.01)
*G06F 16/28* (2019.01)

(52) U.S. Cl.
CPC .......... *G06F 16/285* (2019.01); *G06F 16/287* (2019.01); *G06F 16/288* (2019.01)

(58) Field of Classification Search
CPC combination set(s) only.
See application file for complete search history.

(56) References Cited

U.S. PATENT DOCUMENTS

| | | | |
|---|---|---|---|
| 6,519,586 B2* | 2/2003 | Anick | G06F 16/951 707/742 |
| 8,510,349 B1 | 8/2013 | Puttick | |
| 8,990,268 B2 | 3/2015 | Riggs | |
| 9,098,564 B2 | 8/2015 | Riggs | |
| 9,104,779 B2* | 8/2015 | Hunt | G06F 16/84 |
| 9,360,982 B2* | 6/2016 | Emanuel | G06F 40/134 |

(Continued)

OTHER PUBLICATIONS

"SimpleFacetParameters—Solr Wiki", last edited Aug. 25, 2014, <http://wiki.apache.org/solr/SimpleFacetParameters#rangefaceting>.

(Continued)

*Primary Examiner* — Farhan M Syed
(74) *Attorney, Agent, or Firm* — Andrew Aubert

(57) ABSTRACT

In an approach to faceted classification, a computer receives a search query. The computer creates a first table of facet value ranges, based on the search query. The computer fetches a first search result corresponding to the search query. The computer retrieves a first facet value associated with the first search result. The computer maps the first facet value to a first facet value range. The computer determines whether the first facet value range is in the first table of facet value ranges. The computer inserts the first facet value range into the first table of facet value ranges. The computer determines whether a number of facet value ranges in the first table of facet value ranges is below a pre-defined threshold. The computer creates a second table of facet value ranges. The computer identifies a second facet value range that includes the first facet value range.

20 Claims, 4 Drawing Sheets

(56) References Cited

U.S. PATENT DOCUMENTS

| | | |
|---|---|---|
| 9,361,358 B2 | 6/2016 | Riggs et al. |
| 9,910,910 B2 | 3/2018 | Riggs et al. |
| 2007/0118542 A1 | 5/2007 | Sweeney |
| 2010/0036789 A1 | 2/2010 | Marleau |
| 2010/0077001 A1 | 3/2010 | Vogel et al. |
| 2011/0320396 A1* | 12/2011 | Hunt .............. G06F 16/84 706/47 |
| 2012/0303598 A1 | 11/2012 | Newnham et al. |
| 2013/0268515 A1 | 10/2013 | Maslovskis |
| 2013/0298050 A1* | 11/2013 | Emanuel .......... G06F 3/0482 715/764 |
| 2015/0134569 A1 | 5/2015 | Riggs |
| 2015/0143300 A1* | 5/2015 | Zhang ............ G16H 40/63 715/845 |
| 2015/0324450 A1 | 11/2015 | Riggs et al. |
| 2016/0098445 A1 | 4/2016 | Riggs et al. |
| 2016/0147887 A1 | 5/2016 | Breno et al. |
| 2016/0147895 A1 | 5/2016 | Breno et al. |

OTHER PUBLICATIONS

Appendix P—List of IBM Patents or Patent Applications Treated as Related, Filed herewith, 2 Pages.

Liu, Jingjing, Michael J. Cole, Chang Liu, Ralf Bierig, Jacek Gwizdka, Nicholas J. Belkin, Jun Zhang, and Xiangmin Zhang. "Search behaviors in different task types." In Proceedings of the 10th annual joint conference on Digital libraries, pp. 69-78. ACM, 2010.

* cited by examiner

OPTIMIZING FACETED CLASSIFICATION THROUGH FACET RANGE IDENTIFICATION

PRIORITY

The instant application is a continuation of U.S. patent application Ser. No. 14/549,991 filed Nov. 21, 2014, which is incorporated by reference in the instant application.

BACKGROUND

The present invention relates generally to the field of data processing, and more particularly to faceted classification of search results.

Document retrieval systems accept a search query and generate a result, which is a set of documents. Queries are often specified by imposing conditions on document metadata (e.g. title, author, year, etc.). Sometimes the documents are representative of real objects, for example, an online catalog lets customers search for products to buy. Result sets are often sorted according to some criteria (e.g. ascending cost). Additional useful information which can be presented in response to a query is a classification of the results according to metadata that is not included in the original query, i.e., showing how the set of results is composed, according to specific "classes" of a property. For example, when searching an online catalog for a television, a certain number of results are identified, and the set of results is subdivided according to one category (e.g. dimension in inches) and subtotals are shown for each one of the possible values of the class (3 results for "17 inches", 5 for "20 inches", 12 for "22 inches", 2 for "25 inches", etc.). This kind of result classification is called faceting.

Faceting is often applied on many different categories at the same time, projecting the result set along orthogonal directions. For example, televisions can be classified according to size, manufacturer, technology, cost range, weight, etc. Faceted searches are maximally useful when a user is trying to identify the best choice among a number of proposals. The usual operation involves a wide query, giving a big result set which is faceted among many axes, each axis subdivided into different subcategories. The user reduces the result set by selecting one or more of the facet values. The additional condition is added to the query, and facets are recalculated.

SUMMARY

Embodiments of the present invention disclose a method, a computer program product, and a system for faceted classification. The method may include one or more computer processors receiving a search query. The one or more computer processors create a first table of facet value ranges, where facet value ranges are based, at least in part, on the search query, and where a first counter of search results associated with the facet value ranges is set to zero. The one or more computer processors fetch a first search result corresponding to the search query. The one or more computer processors retrieve a first facet value associated with the first search result. The one or more computer processors map the first facet value to a first facet value range. The one or more computer processors determine whether the first facet value range is in the first table of facet value ranges. Responsive to determining the first facet value range is not in the first table of facet value ranges, the one or more computer processors insert the first facet value range into the first table of facet value ranges. Responsive to inserting the first facet value range into the first table of facet value ranges, the one or more computer processors set a second counter of search results in the first facet value range to zero. Responsive to setting the second counter of search results associated with the first facet value range to zero, the one or more computer processors increase the second counter of search results by one. Responsive to inserting the first facet value range into the first table of facet value ranges, the one or more computer processors determine whether a number of facet value ranges in the first table of facet value ranges is below a pre-defined threshold. Responsive to determining the number of facet value ranges is not below the pre-defined threshold, the one or more computer processors create a second table of facet value ranges, in which a resolution of facet value ranges in the second table of facet value ranges is more coarse than a resolution of facet value ranges in the first table of facet value ranges, and in which a third counter of search results associated with the facet value ranges is set to zero. The one or more computer processors identify a second facet value range that includes the first facet value range.

DETAILED DESCRIPTION

In faceted classification, if the classification axis is an enumeration, subcategories can be immediately defined in obvious ways. For example, if searching for a television, enumeration classifications may include plasma, LCD, and CRT. If, instead, parameters have a continuous range (e.g. price, dimensions, or dates), in order to avoid a multitude of poorly populated classes, the preference is to divide the values into ranges, or bins, such as $200-$250, $250-$300, etc. The ranges should be wide enough to let many results fall in the same bin, but also be narrow enough to permit an effective drill down of the results. For example, a range which is $50 wide can be good for televisions, but is too small for cars and too wide for candies. A static decision of range size can be suboptimal in many applications. For example, when classifying by date, searches related to recent events give results spanning several weeks, and can be faceted per day. Other searches give results spanning one century, and are preferably faceted with ranges 5 years wide.

Embodiments of the present invention recognize that efficiency can be gained by implementing a search system that automatically identifies optimal ranges for faceted classification. The improved efficiency aids the user as well as reducing computer resource consumption. Implementation of embodiments of the invention may take a variety of forms, and exemplary implementation details are discussed subsequently with reference to the Figures.

Figure 1:
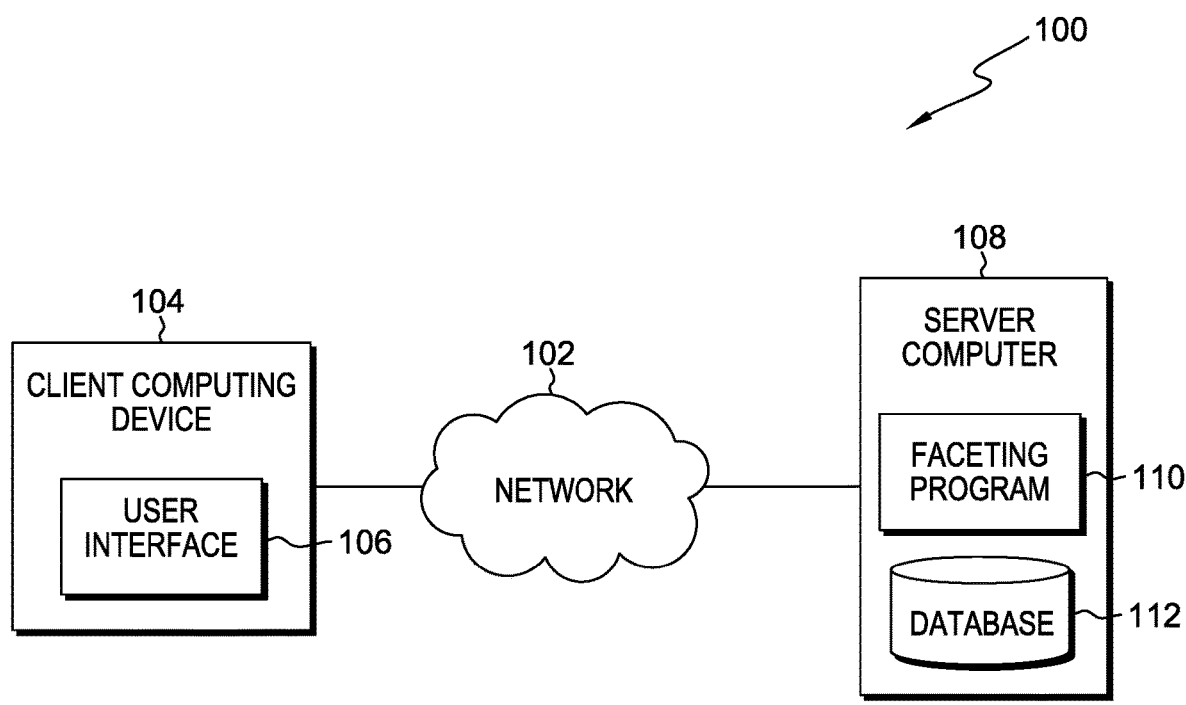
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information.

Client computing device 104 can be a desktop computer, a laptop computer, a tablet computer, a specialized computer server, a smart phone, or any programmable electronic device capable of communicating with server computer 108 via network 102 and with various components and devices within distributed data processing environment 100. In general, client computing device 104 represents any programmable electronic device or combination of programmable electronic devices capable of executing machine readable program instructions and communicating with other computing devices via a network, such as network 102. Client computing device 104 includes user interface 106.

User interface 106 provides an interface between a user of client computing device 104 and server computer 108. User interface 106 may be a graphical user interface (GUI) or a web user interface (WUI) and can display text, documents, web browser windows, user options, application interfaces, and instructions for operation, and includes the information (such as graphic, text, and sound) that a program presents to a user and the control sequences the user employs to control the program. User interface 106 may also be mobile application software that provides an interface between a user of client computing device 104 and server computer 108. Mobile application software, or an "app", is a computer program designed to run on smart phones, tablet computers and other mobile devices. User interface 106 enables a user of client computing device 104 to perform faceted searches with optimal ranges on server computer 108.

Server computer 108 can be a management server, a web server, or any other electronic device or computing system capable of receiving and sending data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 via network 102. In another embodiment, server computer 108 represents a computing system utilizing clustered computers and components to act as a single pool of seamless resources. Server computer 108 includes faceting program 110 and database 112.

Faceting program 110 fetches search results via network 102 for a user-inputted query and automatically generates ranges for facets with continuous values according to the actual results. Faceting program 110 evaluates each search result individually and classifies the results in bins with very fine resolution, i.e., narrow ranges. After a certain number of results have been collected, the number of distinct categories may grow beyond a pre-defined threshold. When the number of ranges exceeds the threshold, faceting program 110 determines that the classification is too fine and more coarse ranges can be used. Faceting program 110 establishes a new set of ranges and repositions the accumulated results in the new bins. If the number of bins still exceeds the threshold, faceting program 110 repeats the process. When faceting program 110 sufficiently reduces the number of ranges, faceting program 110 resumes fetching search results and increases an appropriate range counter, according to each new result. Whenever the number of ranges exceeds the threshold, faceting program 110 makes the ranges wider to allow collapsing to occur. Faceting program 110 is depicted and described in further detail with respect to FIG. 2, FIG. 3A, and FIG. 3B.

Database 112 resides on server computer 108. In another embodiment, database 112 can reside elsewhere in the environment. A database is an organized collection of data. Database 112 can be implemented with any type of storage device capable of storing data that can be accessed and utilized by server computer 108, such as a database server, a hard disk drive, or a flash memory. In other embodiments, database 112 can represent multiple storage devices within server computer 108. Database 112 stores results related to search queries. Database 112 also stores tables used by faceting program 110 to track range width and count entries per range. In addition, database 112 stores a value for the threshold number of ranges. In one embodiment, the software developer pre-defines the threshold. In another embodiment, a user may choose a preferred limit to the number of ranges via user interface 106.

Figure 2:
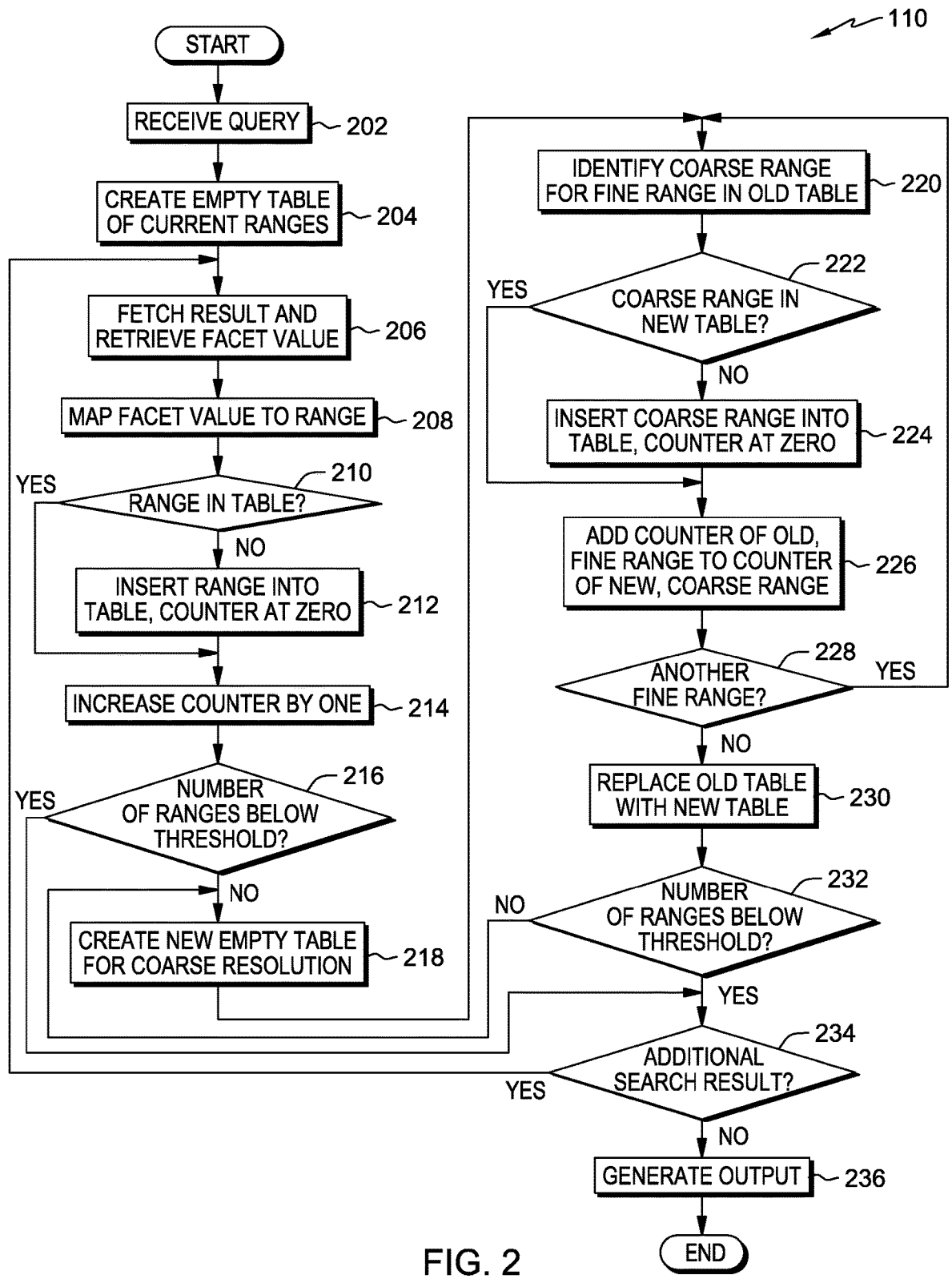
FIG. 2 is a flowchart depicting operational steps of a faceting program, on a server computer within the distributed data processing environment of FIG. 1, for optimizing faceted classification, in accordance with an embodiment of the present invention.

FIG. 2 is a flowchart depicting operational steps of faceting program 110, on server computer 108 within distributed data processing environment 100 of FIG. 1, for optimizing faceted classification, in accordance with an embodiment of the present invention.

Faceting program 110 receives a query (step 202). When a user of client computing device 104 begins a search query, via user interface 106, faceting program 110 receives the query, via network 102.

Faceting program 110 creates an empty table of current ranges (step 204). Facet values are taken from the metadata associated with the item requested in the search query. The metadata includes fields that represent characteristics of an item. For example, a book has an author, a title, and a price. Fields that have continuous values, such as price, are suitable for faceting. In one embodiment, the software developer pre-defines ranges for faceting program 110 to use with search queries. Faceting program 110 begins the faceted classification process by creating an empty table of ranges of the finest resolution for the particular facet value and creating a counter for each of the ranges where the counter is initially set to zero. For example, if the search query pertains to dates, faceting program 110 sets the current ranges to a width of 1 day, i.e., "10/01/2014", "10/02/2014", "10/03/2014", etc. In another example, if the search query pertains to prices, faceting program 110 may set the current ranges to a width of $1, i.e., "$0-$1", "$1.01-$2", "$2.01-$3", etc. Faceting program 110 stores the empty table in database 112. Faceting program 110 populates the empty table with a maximum number of ranges that matches a pre-defined threshold for quantity of ranges.

Faceting program 110 fetches a result and retrieves a facet value (step 206). Faceting program 110 fetches a search result based on the query and retrieves the facet value for the search result. For example, if the query is for televisions in an online catalog, and the facet axis is price, then faceting program 110 fetches a particular television model from the online catalog and retrieves the price of the television.

Faceting program 110 maps the facet value to a range (step 208). Faceting program 110 maps the facet value to the range that contains the facet value, according to the current resolution. For example, if the price of a television is $400, and the resolution of the ranges is a width of $1, then the range that contains the price is $399.01-$400.

Faceting program 110 determines whether the range is in the table (decision block 210). Faceting program 110 compares the ranges in the table to the range that contains the facet value and determines whether the range that contains the facet value exists in the table. If faceting program 110 determines that the range that contains the facet value does not exist in the table ("no" branch, decision block 210), then faceting program 110 inserts the range that contains the facet value into the table and sets a counter for the range to zero (step 212). If the range that contains the value of the facet is, for example, $399.01-$400, then faceting program 110 adds the range $399.01-$400 to the table. In order to provide the user with a quantity of results per range, faceting program 110 provides a counter for each range to track the results.

Responsive to setting the counter to zero, or if faceting program 110 determines the range is in the table ("yes" branch, decision block 210), then faceting program 110 increases the counter by one (step 214). As faceting program 110 adds the search result to the table, faceting program 110 increases the counter of results per range by one. For example, if 5 of the search results are in one range, the counter for the range equals 5.

Faceting program 110 determines whether the number of ranges is below the threshold (decision block 216). Faceting program 110 compares the number of ranges in the table to the pre-defined threshold number of ranges and determines whether the number of ranges in the table is below the threshold number. If faceting program 110 determines the number of ranges in the table is below the threshold ("yes" branch, decision block 216), then faceting program 110 determines whether there is an additional search result to fetch (decision block 234).

If faceting program 110 determines the number of ranges in the table is not below the threshold ("no" branch, decision block 216), then faceting program 110 creates a new, empty table for a more coarse resolution (step 218). Faceting program 110 creates a new, empty table in database 112 to accommodate a more coarse resolution of ranges than exist in the current table, and creates a counter for each of the ranges in the new table where the counter is initially set to zero. Creating a more coarse resolution enables faceting program 110 to reduce the number of ranges in order to maintain the threshold number of ranges and to contain the fetched facet values. For example, if the current facet axis is dates, and faceting program 110 determines the resolution of one day per range cannot contain the current facet value within the threshold number of ranges, then faceting program 110 creates a new, empty table that can accommodate a more coarse resolution, such as one week per range.

Faceting program 110 identifies a coarse range for a fine range in the old table (step 220). For each fine range in the old table, faceting program 110 identifies a coarse range that includes the fine range. For example, if the fine range width is one day, then faceting program 110 can identify a more coarse range of one week. The range of one day falls within the range of one week. When creating the coarse range, faceting program 110 confirms that the fine bin range can be contained within the coarse bin range. For example, moving from a range of one day to one week is acceptable. Moving from a range of one week to one month is not acceptable because a week may reside in more than one month, such as if the end of a month lands on a Tuesday. Therefore if faceting program 110 identifies a more coarse range than one week, then faceting program 110 creates a range of two weeks or four weeks, depending on the threshold number of ranges and the actual search results.

Faceting program 110 determines whether the coarse range is in the new table (decision block 222). Similar to the discussion of step 210, faceting program 110 compares the ranges in the new table to the coarse range that contains the facet value and determines whether the range that contains the facet value exists in the new table. For example, if a previously fetched facet value in the coarse range has already been added to the table, the coarse range may already exist in the new table. If faceting program 110 determines that the coarse range that contains the facet value does not exist in the table ("no" branch, decision block 222), then faceting program 110 inserts the coarse range that contains the facet value into the table and sets a counter for the range to zero (step 224).

Responsive to faceting program 110 setting the counter to zero, or if faceting program 110 determines the coarse range is in the new table ("yes" branch, decision block 222), then faceting program 110 adds the counter of the old, fine range to the counter of the new, coarse range (step 226). In order to maintain the count of the search results, faceting program 110 adds the quantity of the original search results in the fine range to the counter of the more coarse range.

Faceting program 110 determines whether there is another fine range (decision block 228). As discussed with respect to step 220, faceting program 110 performs the process of mapping existing bins into new bins by identifying a new, coarse range for each fine range present in the old table. If faceting program 110 determines that another fine range exists ("yes" branch, decision block 228), then faceting program 110 returns to step 220 and repeats the process of inserting a coarse range that contains the fine range into the table and increasing the counter of the coarse range.

If faceting program 110 determines that another fine range does not exist ("no" branch, decision block 228), then faceting program 110 replaces the old table with the new table (step 230). When faceting program 110 has inserted enough coarse ranges into the new table to contain all of the fine ranges, then faceting program 110 deletes the old table in database 112 and replaces the old table with the new table in database 112.

Faceting program 110 determines whether the number of ranges is below the threshold (decision block 232). As discussed earlier with respect to decision block 216, faceting program 110 compares the number of ranges in the new table to the pre-defined threshold number of ranges and determines whether the number of ranges is below the threshold number. If faceting program 110 determines that the number of ranges is not below the threshold ("no" branch, decision block 232), then faceting program 110 returns to step 218 and begins the process of creating a new, empty table for a new, more coarse resolution.

If faceting program 110 determines the number of ranges is below the threshold ("yes" branch, decision block 232), then faceting program 110 determines whether there is an additional search result to fetch (decision block 234). Faceting program 110 determines whether the initial query yields an additional search result. If faceting program 110 determines there is an additional search result ("yes" branch, decision block 234), then faceting program 110 returns to step 206, fetches the additional search result, and retrieves the facet value.

If faceting program 110 determines there is no additional search result ("no" branch, decision block 234), then faceting program 110 generates output (step 236). When faceting program 110 completes fetching search results for the user-inputted search query, faceting program 110 outputs a current table that includes the list of ranges and the counter associated with each range.

The discussion of FIG. 2, above, describes faceting program 110 processing search results for one facet. In an embodiment, faceting program 110 processes one or more facets simultaneously inside the fetching loop.

Figure 3A:
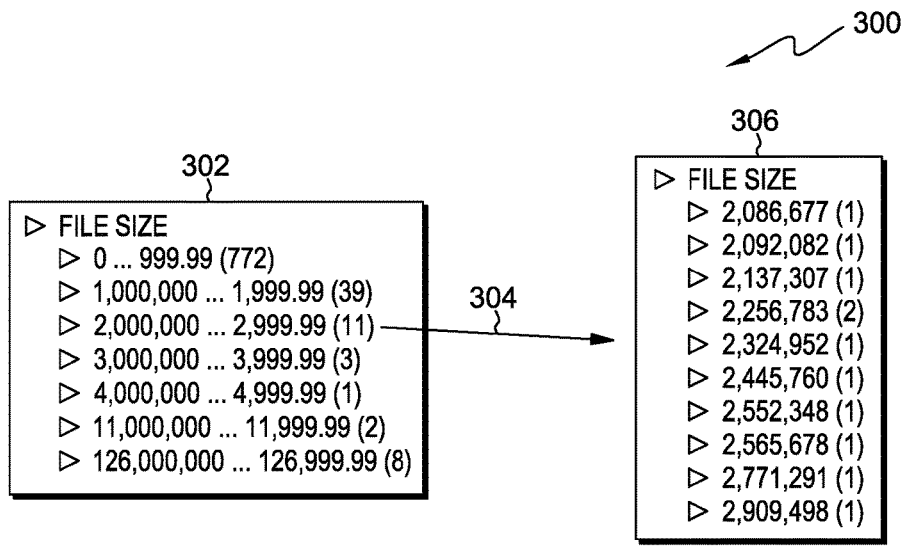
FIG. 3A and FIG. 3B illustrate examples of the use of the faceting program, on the server computer within the distributed data processing environment of FIG. 1, in accordance with an embodiment of the present invention.
Figure 3B:
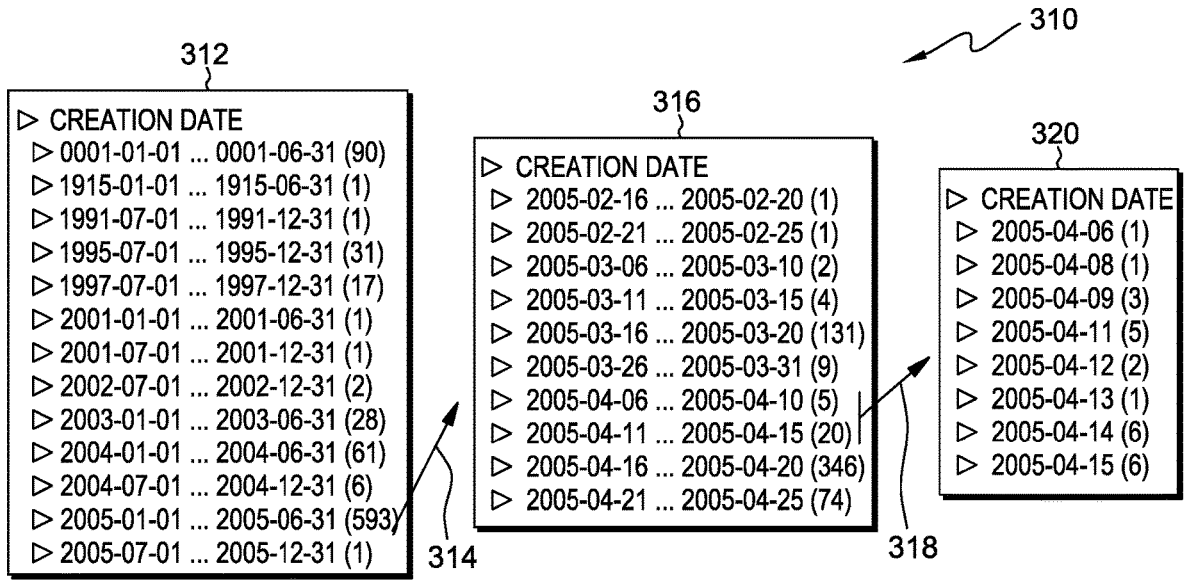

FIG. 3A and FIG. 3B illustrate examples of the use of faceting program 110, on server computer 108 within distributed data processing environment 100 of FIG. 1, in accordance with an embodiment of the present invention.

FIG. 3A illustrates an embodiment of faceting program 110 where the user utilizes faceting program 110 to further refine, or drill down, the initial search results. In numeric format diagram 300, table 302 represents the initial results of a search query of data in numeric format where the maximum number of ranges, i.e. the threshold, is 15. Faceting program 110 produces initial search results with a range width of 1,000,000 which includes 7 ranges. The count of the number of search results in each range is depicted in parentheses next to the range. To produce table 302, faceting program 110 begins with the finest resolution of range width set at 1, and processes the search results through increasingly coarse resolutions until the number of ranges is less than the threshold. Arrow 304 indicates a user request to drill down to the 11 results in the range 2,000,000 to 2,999,999. In response to a new request, faceting program 110 restarts the faceting process with the results in the specified range, using the finest resolution until the number of ranges exceeds the threshold, and then iterating through more coarse resolutions until all of the search results are contained in a number of ranges below the threshold. Faceting program 110 produces table 306. Although the ranges in table 306 are each only 1 wide, there are 10 ranges, not 1,000,000. In the example, a finest resolution of 1 is adequate to contain the number of ranges below the threshold. Faceting program 110 can spend the allowed threshold number of ranges while leaving holes in the continuous space. Although the maximum number of ranges is 15, faceting program 110 creates 7 ranges in table 302 and 10 ranges in table 306 because any additional ranges do not contain results, therefore the 7 ranges and the 10 ranges efficiently display the full set of results.

FIG. 3B is similar to FIG. 3A as FIG. 3B also illustrates an example of the results of a user utilizing faceting program 110 to drill down the initial search results. In date format diagram 310, table 312 represents the initial results of a search query of data in date format where the maximum number of ranges, i.e. the threshold, is 15. Faceting program 110 produces initial search results with a range width of 6 months which includes 13 ranges. The count of the number of search results in each range is depicted in parentheses next to the range. In response to a new request, faceting program 110 restarts the faceting process with the results in the specified range, using the finest resolution until the number of ranges exceeds the threshold, and then iterating through more coarse resolutions until all of the search results are contained in a number of ranges below the threshold. Arrow 314 indicates a user request to drill down to the 593 results in the range 2005-01-01 to 2005-06-31. Faceting program 110 produces table 316. Table 316 includes 10 ranges, and each range is 5 days wide. In the embodiment depicted in date format diagram 310, faceting program 110 allows the user to request to drill down the results in more than one range, via user interface 106. For example, faceting program 110 may display a pop-up box on client computing device 104 with a message such as "Choose one or more ranges for additional drill down." In date format diagram 310, arrow 318 indicates a user request to drill down to the 5 results in the range 2005-04-06 to 2005-04-10 and to the 20 results in the range 2005-04-11 to 2005-04-15. Faceting program 110 restarts the faceting process and produces table 320. Table 320 includes 8 ranges, and each range is 1 day wide. For table 320, the finest resolution of 1 day wide is adequate to display the results in less than 15 bins.

Figure 4:
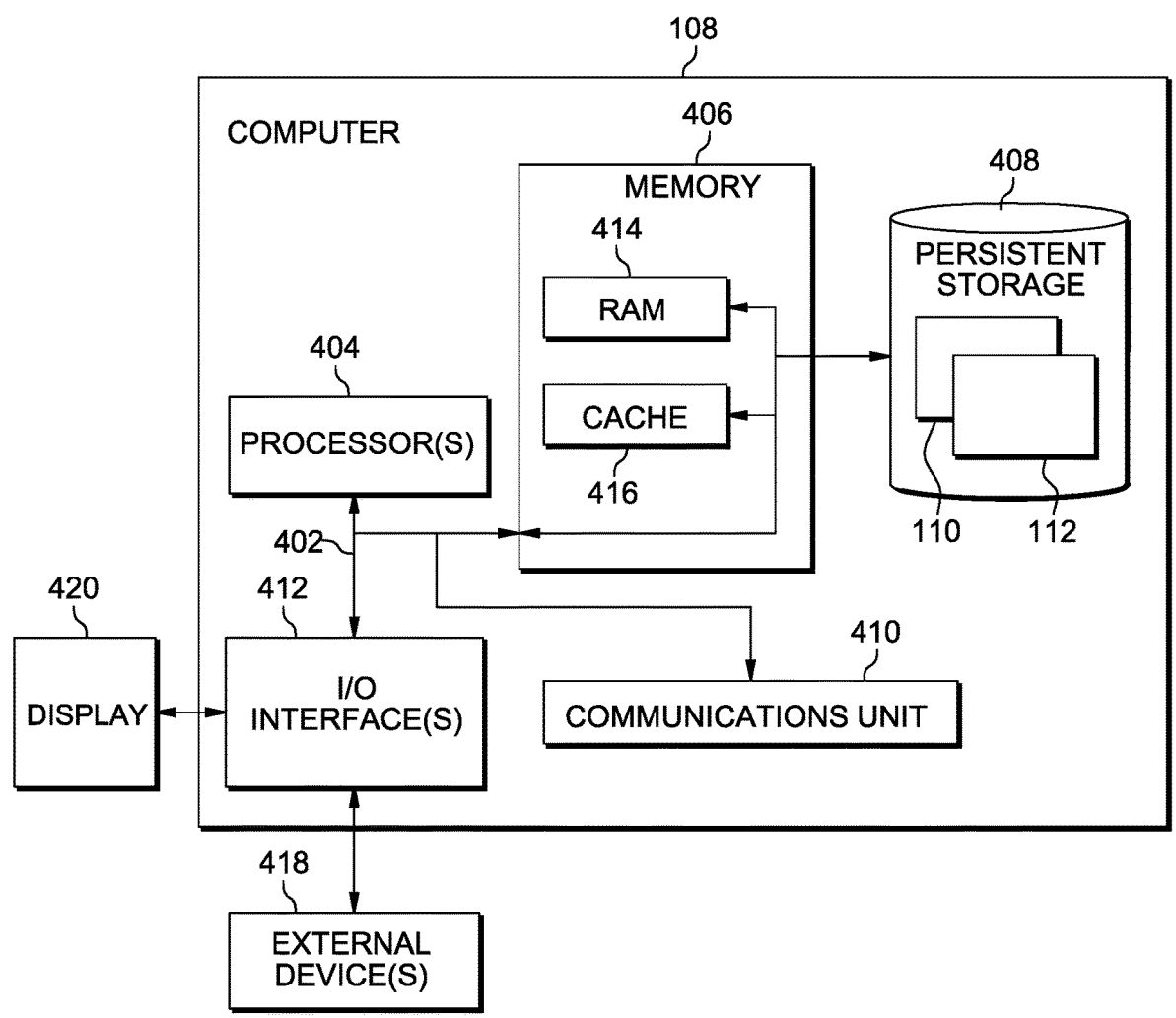
FIG. 4 depicts a block diagram of components of the server computer executing the faceting program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Faceting program 110 and database 112 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Faceting program 110 and database 112 may be downloaded to persistent storage 408 through communications unit 410.

I/O interface(s) 412 allows for input and output of data with other devices that may be connected to server computer 108. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., faceting program 110 and database 112, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for faceted classification, the method comprising:
    determining whether a first facet value range is in a first table of facet value ranges, wherein facet value ranges are based, at least in part, on a search query results data set, and wherein a first counter of search results associated with the facet value ranges is set to zero;
    responsive to determining the first facet value range is not in the first table of facet value ranges, inserting the first facet value range into the first table of facet value ranges;
    responsive to inserting the first facet value range into the first table of facet value ranges, setting a second counter of search results associated with the first facet value range to zero;
    responsive to setting the second counter of search results associated with the first facet value range to zero, increasing the second counter of search results by one;
    responsive to inserting the first facet value range into the first table of facet value ranges, determining whether a number of facet value ranges in the first table of facet value ranges is below a pre-defined threshold;
    responsive to determining the number of facet value ranges is not below the pre-defined threshold, creating a second table of facet value ranges, wherein a resolution of facet value ranges in the second table of facet value ranges is more coarse than a resolution of facet value ranges in the first table of facet value ranges, and wherein a third counter of search results associated with the facet value ranges is set to zero;
    responsive to determining the number of facet value ranges exceeds the threshold, making the ranges wider to allow collapsing to occur;
    identifying a second facet value range that includes the first facet value range; and
    outputting, over a computer network, a modified search query results data set, wherein the modified search query results data set is based, at least in part, on the identified second facet value range and the search query results data set;
    wherein the search query results data set is a plurality of electronic data records from a computer database.

2. The method of claim 1, further comprising, responsive to determining the first facet value range is in the first table of facet value ranges, increasing the first counter of search results by one.

3. The method of claim 1, further comprising:
    responsive to identifying the second facet value range that includes the first facet value range, determining whether the second facet value range is in the second table of facet value ranges;
    responsive to determining the second facet value range is not in the second table of facet value ranges, inserting the second facet value range into the second table of facet value ranges; and
    replacing the first table of facet value ranges with the second table of facet value ranges.

4. The method of claim 3, further comprising:
    responsive to inserting the second facet value range into the second table of facet value ranges, setting a fourth counter of search results in the second facet value range to zero; and
    adding the second counter of search results of the first facet value range to the fourth counter of search results.

5. The method of claim 3, further comprising, responsive to determining the second facet value range is in the second table of facet value ranges, adding the second counter of search results of the first facet value range to the third counter of search results.

6. The method of claim 3, further comprising:
    responsive to outputting a modified search query results data set, receiving from the user a request to drill down the facet value ranges.

7. The method of claim 6, wherein a search result output includes a search result and a counter associated with the search result.

8. A computer program product for faceted classification, the computer program product comprising:
    one or more computer readable storage media and program instructions stored on the one or more computer readable storage media, the program instructions comprising:
    program instructions to determine whether a first facet value range is in a first table of facet value ranges, wherein facet value ranges are based, at least in part, on a search query results data set, and wherein a first counter of search results associated with the facet value ranges is set to zero;
    responsive to determining the first facet value range is not in the first table of facet value ranges, program instructions to insert the first facet value range into the first table of facet value ranges;
responsive to inserting the first facet value range into the first table of facet value ranges, program instructions to set a second counter of search results associated with the first facet value range to zero;
responsive to setting the second counter of search results associated with the first facet value range to zero, program instructions to increase the second counter of search results by one;
responsive to inserting the first facet value range into the first table of facet value ranges, program instructions to determine whether a number of facet value ranges in the first table of facet value ranges is below a pre-defined threshold;
responsive to determining the number of facet value ranges is not below the pre-defined threshold, program instructions to create a second table of facet value ranges, wherein a resolution of facet value ranges in the second table of facet value ranges is more coarse than a resolution of facet value ranges in the first table of facet value ranges, and wherein a third counter of search results associated with the facet value ranges is set to zero;
responsive to determining the number of facet value ranges exceeds the threshold, program instructions to make the ranges wider to allow collapsing to occur;
program instructions to identify a second facet value range that includes the first facet value range; and
program instructions to output a modified search query results data set, wherein the modified search query results data set is based, at least in part, on the identified second facet value range and the search query results data set;
wherein the search query results data set is a plurality of electronic data records from a computer database.

9. The computer program product of claim 8, further comprising, responsive to determining the first facet value range is in the first table of facet value ranges, program instructions to increase the first counter of search results by one.

10. The computer program product of claim 8, further comprising:
responsive to identifying the second facet value range that includes the first facet value range, program instructions to determine whether the second facet value range is in the second table of facet value ranges;
responsive to determining the second facet value range is not in the second table of facet value ranges, program instructions to insert the second facet value range into the second table of facet value ranges; and
program instructions to replace the first table of facet value ranges with the second table of facet value ranges.

11. The computer program product of claim 10, further comprising:
responsive to inserting the second facet value range into the second table of facet value ranges, program instructions to set a fourth counter of search results in the second facet value range to zero; and
program instructions to add the second counter of search results of the first facet value range to the fourth counter of search results.

12. The computer program product of claim 10, further comprising, responsive to determining the second facet value range is in the second table of facet value ranges, program instructions to add the second counter of search results of the first facet value range to the third counter of search results.

13. The computer program product of claim 10, further comprising:
responsive to outputting a modified search query results data set, program instructions to receive from the user a request to drill down the facet value ranges.

14. The computer program product of claim 13, wherein a search result output includes a search result and a counter associated with the search result.

15. A computer system for faceted classification, the computer system comprising:
one or more computer processors;
one or more computer readable storage media;
program instructions stored on the one or more computer readable storage media for execution by at least one of the one or more computer processors, the program instructions comprising:
program instructions to determine whether a first facet value range is in a first table of facet value ranges, wherein facet value ranges are based, at least in part, on a search query results data set, and wherein a first counter of search results associated with the facet value ranges is set to zero;
responsive to determining the first facet value range is not in the first table of facet value ranges, program instructions to insert the first facet value range into the first table of facet value ranges;
responsive to inserting the first facet value range into the first table of facet value ranges, program instructions to set a second counter of search results associated with the first facet value range to zero;
responsive to setting the second counter of search results associated with the first facet value range to zero, program instructions to increase the second counter of search results by one;
responsive to inserting the first facet value range into the first table of facet value ranges, program instructions to determine whether a number of facet value ranges in the first table of facet value ranges is below a pre-defined threshold;
responsive to determining the number of facet value ranges is not below the pre-defined threshold, program instructions to create a second table of facet value ranges, wherein a resolution of facet value ranges in the second table of facet value ranges is more coarse than a resolution of facet value ranges in the first table of facet value ranges, and wherein a third counter of search results associated with the facet value ranges is set to zero;
responsive to determining the number of facet value ranges exceeds the threshold, program instructions to make the ranges wider to allow collapsing to occur;
program instructions to identify a second facet value range that includes the first facet value range; and
program instructions to output a modified search query results data set, wherein the modified search query results data set is based, at least in part, on the identified second facet value range and the search query results data set;
wherein the search query results data set is a plurality of electronic data records from a computer database.

16. The computer system of claim 15, further comprising, responsive to determining the first facet value range is in the first table of facet value ranges, program instructions to increase the first counter of search results by one.

17. The computer system of claim 15, further comprising:
responsive to identifying the second facet value range that includes the first facet value range, program instructions to determine whether the second facet value range is in the second table of facet value ranges;
responsive to determining the second facet value range is not in the second table of facet value ranges, program instructions to insert the second facet value range into the second table of facet value ranges; and
program instructions to replace the first table of facet value ranges with the second table of facet value ranges.

18. The computer system of claim 17, further comprising:
responsive to inserting the second facet value range into the second table of facet value ranges, program instructions to set a fourth counter of search results in the second facet value range to zero; and
program instructions to add the second counter of search results of the first facet value range to the fourth counter of search results.

19. The computer system of claim 17, further comprising, responsive to determining the second facet value range is in the second table of facet value ranges, program instructions to add the second counter of search results of the first facet value range to the third counter of search results.

20. The computer system of claim 17, further comprising:
responsive to outputting a modified search query results data set, program instructions to receive from a user a request to drill down the facet value ranges.

\* \* \* \* \*